United States Patent [19]
Cecil et al.

[11] Patent Number: 5,864,937
[45] Date of Patent: Feb. 2, 1999

[54] BOLT AND WASHER ASSEMBLY MACHINE AND METHOD OF ASSEMBLY

[75] Inventors: Elmer Cecil, Marine City, Mich.; William E. Deason, Englewood, Fla.; Everett Cecil, Jr., St. Clair Shores, Mich.

[73] Assignee: Direct Tool, Inc., Warren, Mich.

[21] Appl. No.: 771,448

[22] Filed: Dec. 20, 1996

[51] Int. Cl.⁶ ............................. B23Q 3/00; B65G 33/02
[52] U.S. Cl. ...................... 29/464; 29/822; 198/467.1; 198/389
[58] Field of Search ......................... 29/783, 822, 464; 198/467.1, 389

[56] References Cited

U.S. PATENT DOCUMENTS

| | | |
|---|---|---|
| 389,648 | 9/1888 | Hamilton . |
| 480,530 | 8/1892 | Tobey . |
| 1,807,591 | 6/1931 | Fleischli et al. . |
| 1,822,099 | 9/1931 | Kmentt . |
| 1,861,889 | 6/1932 | Stoll . |
| 1,946,820 | 2/1934 | Stoll . |
| 1,958,180 | 5/1934 | Brackett . |
| 2,073,396 | 3/1937 | Scholz . |
| 2,190,077 | 2/1940 | Majusick . |
| 2,278,689 | 4/1942 | Chilton . |
| 2,284,698 | 6/1942 | Trotter . |
| 2,288,620 | 7/1942 | Goodhue . |
| 2,291,484 | 7/1942 | Mulvany . |
| 2,333,940 | 11/1943 | Kuehlman . |
| 2,377,431 | 6/1945 | Lakso ..................................... 198/389 |
| 2,716,761 | 9/1955 | Nielsen . |
| 2,716,762 | 9/1955 | Stern . |
| 2,914,781 | 12/1959 | Prutton . |
| 2,927,333 | 3/1960 | Stern . |
| 2,985,900 | 5/1961 | Nouvelet . |
| 3,012,258 | 12/1961 | Schott et al. . |
| 3,012,344 | 12/1961 | Schott . |
| 3,052,969 | 9/1962 | Loven . |
| 3,095,344 | 6/1963 | Sandow . |
| 3,100,307 | 8/1963 | Hatherell et al. . |
| 3,103,023 | 9/1963 | Zdanis . |
| 3,114,159 | 12/1963 | Yoshikawa . |
| 3,155,993 | 11/1964 | Stern . |
| 3,168,185 | 2/1965 | Bader et al. ............................ 198/389 |
| 3,212,114 | 10/1965 | Pipes . |
| 3,226,744 | 1/1966 | Marechal et al. . |
| 3,406,414 | 10/1968 | Kulaga et al. . |
| 3,523,316 | 8/1970 | Alexander . |
| 3,568,229 | 3/1971 | Moore et al. . |
| 3,638,260 | 2/1972 | Brown et al. . |
| 3,654,650 | 4/1972 | Burgess, Jr. et al. . |
| 3,745,599 | 7/1973 | Ringland . |
| 3,750,206 | 8/1973 | Pomernacki . |
| 3,872,530 | 3/1975 | Festerling . |
| 3,884,347 | 5/1975 | Gallagher et al. ...................... 198/389 |
| 3,914,814 | 10/1975 | Beissner . |
| 4,020,515 | 5/1977 | Goerke et al. . |
| 4,058,866 | 11/1977 | Foster . |
| 4,084,687 | 4/1978 | Lapeyre . |
| 4,237,605 | 12/1980 | Jung et al. . |
| 4,309,787 | 1/1982 | Lapohn . |
| 4,453,308 | 6/1984 | Jackson . |
| 4,470,194 | 9/1984 | Cambiaghi et al. . |
| 5,308,285 | 5/1994 | Malen et al. . |

*Primary Examiner*—Paul T. Sewell
*Assistant Examiner*—Jila Mohandesi
*Attorney, Agent, or Firm*—Vanophem Meehan & Vanophem, P.C.

[57] ABSTRACT

A device for assembling an element, such as a washer, to the end of a fastener, such as a bolt, in a reliable, high-speed fashion wherein the assembling device includes the washers being supplied in a position to be picked up by an end of the shank of the bolt and slides along a ramp causing the washer to be positioned closer to the head of the bolt. The bolts are supplied to the assembling machine in an upright, in-line position. The bolts are conveyed through the assembling machine utilizing a screw having a thread designed to receive a portion of the shank of the bolt within the thread and cause the bolt to catch the hole of the washer and be assembled therewith into the assembled bolt and washer.

5 Claims, 4 Drawing Sheets

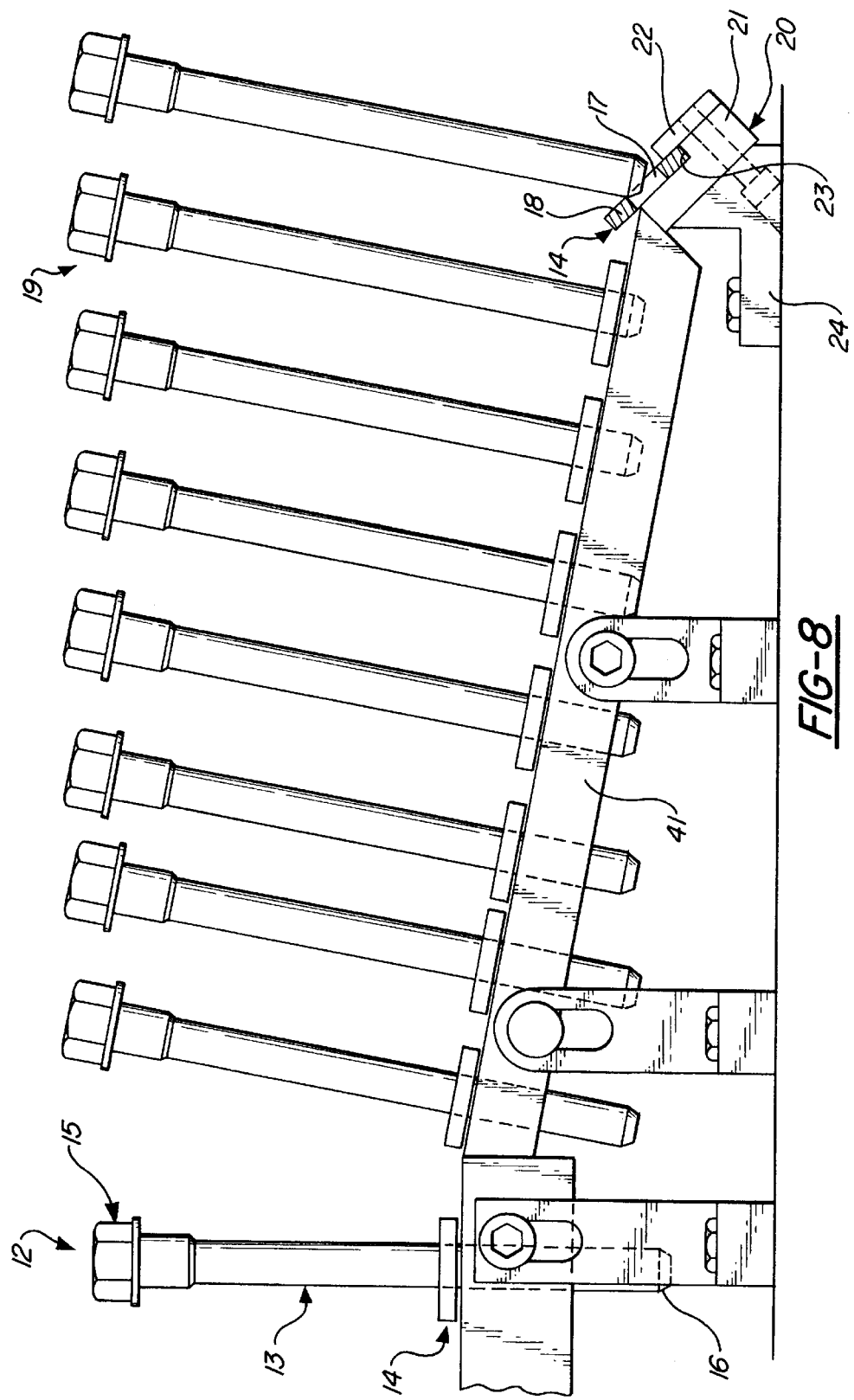

BOLT AND WASHER ASSEMBLY MACHINE AND METHOD OF ASSEMBLY

BACKGROUND OF THE INVENTION

1. Field of the Invention

The present invention generally relates to a conveying device and more particularly to a conveying device adapted to move a bolt or similar fastening device along a straight line path over a defined distance and to place a washer, or similar element, onto the shank of the bolt. More particularly, the present invention is related to an apparatus for assembling a washer onto a bolt using a screw type conveyor which moves the bolt in a linear direction while the washer, or similar element, is placed onto the shank of the bolt.

2. Description of the Prior Art

Prior to the present invention, there have been a plethora of devices utilized in the field of assembling bolts and similar fastening devices to washers and similar elements in an expedited fashion and without the need for human intervention. The goals of all of these devices are typically to eliminate the need of human labor when combining two elements, upon a bolt and a washer, in a predictable, fast and efficient manner.

The bolt and washer, for example, are assembled in either one of two states, the first being of the type where the washer freely slides over the fastener or bolt and there is no interference fit between the two. The second is where the washer has an interference fit with the fastener. In each of the above types of fasteners, however, many different apparatus are used to achieve the end result.

One common apparatus uses single or multiple rotating wheels (or discs) to move the bolt (or washer) to a preselected engagement point to meet with the other element with which it is to be combined. In this type of device, the head of the bolt is usually magnetically held by a rotating wheel and the washer is assembled with the head of the bolt in a capture-type arrangement. Some typical examples of the above type of apparatus are Foster, U.S. Pat. No. 4,058,866; Lapohn, U.S. Pat. No. 4,309,787; Stern, U.S. Pat. No. 3,155,993; Pipes, U.S. Pat. No. 3,212,114; Jung et al, U.S. Pat. No. 4,237,605; Jackson, U.S. Pat. No. 4,453,308; Cambiaghi et al, U.S. Pat. No. 4,470,194; and Prutton, U.S. Pat. No. 2,914,781, as well as others. Typically, these types of devices utilize an inclined surface along which the washer and/or bolt are moved in relation to one another in order to achieve the assembly or pick up of the washer on the bolt and the insertion of the washer all the way to the underside of the head of the bolt. These types of devices require moving both the fastener and the washer to the point where they engage each other. This configuration adds unnecessary complexity to the device.

In contrast to the above rotating or disc-like assembly machines, there are several apparatus which utilize an in-line assembly technique. Examples of the above types of apparatus are U.S. Pat. No. 389,648 to Hamilton; U.S. Pat. No. 2,288,620 to Goodhue; U.S. Pat. No. 2,073,096 to Scholz; U.S. Pat. No. 3,103,023 to Zdanis; U.S. Pat. No. 2,333,940 to Kuehlman, and U.S. Pat. No. 3,872,530 to Festerling, as well as other references listed above. In this latter type of device, typically the fastener or bolt is moved in series fashion, one after the other, along a tractor or chain-type device utilized to cause the bolt to move within a defined track. As the bolts move along the track, the shank end of the bolts are caused to come into orientation with washers in a temporary stationary position which are picked up and inserted onto the shank of the bolt. Commonly, a ramp surface of some type is used to move the washer onto and along the shank of the bolt to achieve assembly of the bolts to the washers.

The Hamilton reference, U.S. Pat. No. 389,648, discloses a declining tube with a slot along the underside of the tube. Nails are gravity fed along a slot to a funnel where each nail is deposited through the funnel onto a washer below. U.S. Pat. No. 2,288,620 to Goodhue discloses a link belt carrier for conveying bolts. The bolts are dropped, shank down, onto a carrier. The carrier has clasps adapted to secure the head of the bolt. As the bolts are held by the clasps, the link belt carrier moves around a sprocket, changing the orientation of the bolt stem to an upward position. Washers descend from a trough and are dropped onto the bolt stem. U.S. Pat. No. 3,103,023 to Zdanis discloses an endless conveyor chain similar to the conveyor in Goodhue. However, Zdanis discloses terminal blocks mounted to the conveyor, for carrying the bolts, shank facing upward, along the conveyor path. As the bolt passes under a chute holding washers, a washer is deposited onto the bolt shank. U.S. Pat. No. 3,872,530 to Festerling discloses moving the bolts downward along a conveyor path which passes over a tube containing washers. As the bolt contacts a washer at the tube discharge end, the bolt stem picks up the top washer. As the bolt continues along a downward incline, the washer is pushed up the shank towards the bolt head.

In both the rotating disc type and in-line assembly type apparatus discussed above, typically the bolt or fastener is moved serially along its path by the gravitational force generated through physical contact with adjoining bolts. This force is generally applied to the head of the bolt and thereby is transferred from bolt to bolt. The only exception to the above is when the bolt is picked up by a rotating wheel and is caught within a recess designed to receive the bolt. In this case, the bolt is carried by the wheel in an arcuate or circular path.

Both the rotating disc as well as in-line assembly apparatus have sever limitations when the demand for higher production rates becomes dominant. The centrifugal forces on disc type rotating devices for large bolts cause disturbing forces resulting in misalignments and dislodging the bolt from the discs while the reliance on gravitational forces with associated unknown frictional components results in uneven movements of the components and inability to achieve high production rates resulting in severe derangement of the assembly operation. What is needed, therefore, is a conveying device for assembling a washer to the shank of a bolt wherein higher production rates not previously attainable are achieved by conveying the shank of the bolt in a rapid positive movement mode so that frictional forces or centrifugal forces do not interfere with movement of the fastener such that at these higher production rates, the bolt and washer still arrive at the predefined position for mounting the washer onto the shank of the bolt.

With respect to known prior art devices, nowhere has there been disclosed or taught the idea of using a conveyor for moving the bolt in a straight line wherein the shank of the bolt or other type of fastener is constrained and moved along the thread of a screw conveyor in a straight line manner. Moving one bolt at a time along the thread on a screw to a supply of washers in place ensures adequate separation of components and reliable transfer, resulting in a faster, more reliable assembly process.

SUMMARY OF THE INVENTION

The present invention is directed generally to a device for combining a washer, or similar element, with a bolt, or similar type of fastener, in an automated process, at high speeds and with high reliability. More particularly, the present invention relates to an apparatus for combining the washer and bolt utilizing a helical screw arranged to define a space which travels in order to ensure that the bolt moves to a predetermined position so as to align the bolt with the washer for combining the two and conveying the combination to an exit point.

The invention concerns a conveying apparatus utilizing a ball screw having a helical thread and a given geometry chosen for conveying a particular fastener element to be combined with a washer. The ball screw is aligned proximate a carrier, or feeder track. The feeder track has a head receiving channel located at its upper end, and a shank receiving channel located at a lower region of the track. An element guiding channel proximate to and aligned with the ball screw, provides a path for the element as it is combined with the washer. The ball screw is located with respect to the track, head receiving channel, shank receiving channel, and element guiding channel such that the shank of the bolt is trapped in the thread of the ball screw and is carried along the helical thread as the ball screw rotates. The ball screw is preferably journalled between a pair of plates and has a motor and gear box connected at one end to provide constant speed rotation of the ball screw. In the preferred embodiment, the ball screw is aligned to have a predefined angle from horizontal such that gravitational forces act to enhance the efficiency in maintaining high productivity and reliability of the bolt and washer assembly machine.

It is an object of the present invention to automatically assemble a washer, or similar element, to a bolt, or similar fastener, in an automated process at high speeds and with high reliability.

It is a further object of the present invention to introduce the bolt to a supply of washers and convey the bolt in a pocket of travel defined by the helical thread of a ball screw as the washer is assembled to the stem of the bolt.

It is yet another object of the present invention to choose a given geometry for the ball screw dependent upon the geometry of the fastener to be conveyed.

BRIEF DESCRIPTION OF THE DRAWINGS

FIG. 2 shows a plan detail view of the assembly portion of the bolt and washer assembly machine of the present invention;

FIG. 8 shows a detail plan view of the bolt and washer pick up and assembly procedure of the present invention.

DETAILED DESCRIPTION OF THE PREFERRED EMBODIMENT

Figure 5:
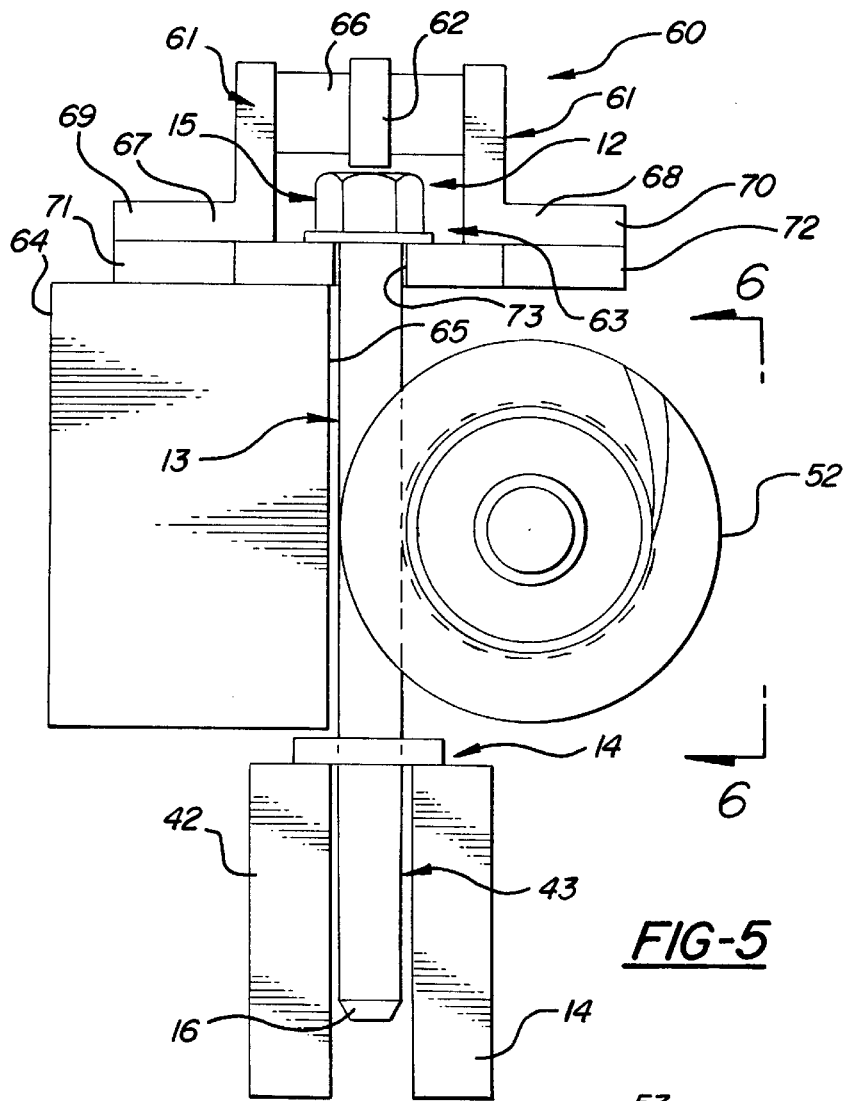
FIG. 5 shows an end view of the screw, carrier and channels for conveying the fastener for combination with the element in the bolt and washer assembly machine of the present invention.

With regard to FIGS. 1 through 8 the invention is a bolt and washer assembly machine 10 for use in the high speed assembly of a fastener or bolt 12 with an element or washer 14, as more clearly depicted in FIG. 5. The assembly machine 10 of the present invention is designed to have a high degree of reliability in assembling the washer 14 on the bolt 12 at high production rates. In particular, the assembly machine 10 of the present invention is designed to preferably operate with bolts 12 having a shank portion 13 which is relatively much longer than the diameter of the head 15 of the bolt 12. The shank portion 13 of the bolt 12 has an end 16 opposite the head 15 which is inserted into a hole 17 in the washer 14. The hole 17 of the washer 14 is defined by a ring 18 as is well known in the art.

Figure 3:
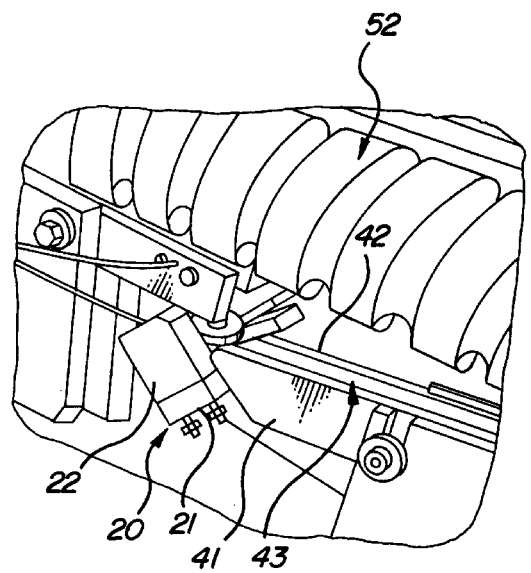
FIG. 3 shows a perspective detail view of the assembly portion of the bolt and washer assembly machine of the present invention.
Figure 4:
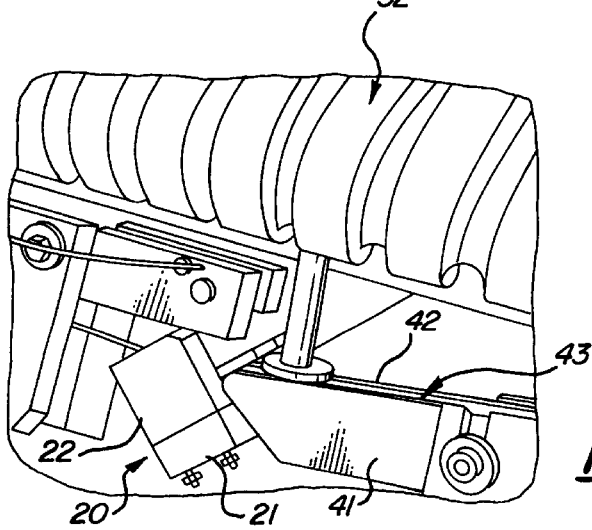
FIG. 4 shows a perspective detail view with the washer already picked up by the bolt of the assembly portion of the bolt and washer assembly machine of the present invention.

The assembly machine 10 is supplied with bolts 12 and washers 14 such that, preferably, there is a continuous supply of both to pass through the assembly machine 10 at a high rate of speed. The washers 14 are supplied along a washer supply rail assembly 20 as illustrated in FIGS. 3 and 8, which is located such that the washer 14 will be aligned at an angle with respect to the end 16 of the shank 13 of the bolt 12 to enable the end 16 to pick up and assemble the washer to the end 16 of the shank 13 of the bolt 12. One edge of the wall of the ring 18 surrounding the hole 17 interacts with the end 16 of the bolt 12 as the bolt 12 is conveyed through the assembly machine 10 as more fully described below. The washer supply rail assembly 20 is designed to receive the washers 14 from a mixing bowl which places the washers 14 flat and in an end to end in-line relationship on the washer supply assembly as is well known in the art. The washer supply assembly primarily consists of a first support member 21 made out of steel and orientated at an appropriate angled position such that the weight of the washers 14 will by gravitational effect or, in the alternative, air assist, act on the next washer 14 so as to cause it to move into position when the end 16 of the bolt 12 picks up or captures a washer 14 so as to cause it to move into position when the end 16 of the bolt 12 picks up or captures a previous washer 14 and moves it off of the washer supply rail assembly 20.

The first support member 21 has a guide member 22 connected thereto to form a pocket 23 with the first support member. The pocket 23 preferably extends for the entire length of the washer supply rail assembly 20. The washer supply rail assembly 20 is connected to a base plate 46 by a mounting bolt 24 which can be adjusted, as required, to ensure that the washers 14 located in the washer supply rail assembly are in the correct orientation to be picked up and assembled with the shank of the bolts 12 in a continuous manner, as best shown in FIG. 8.

Figure 7:
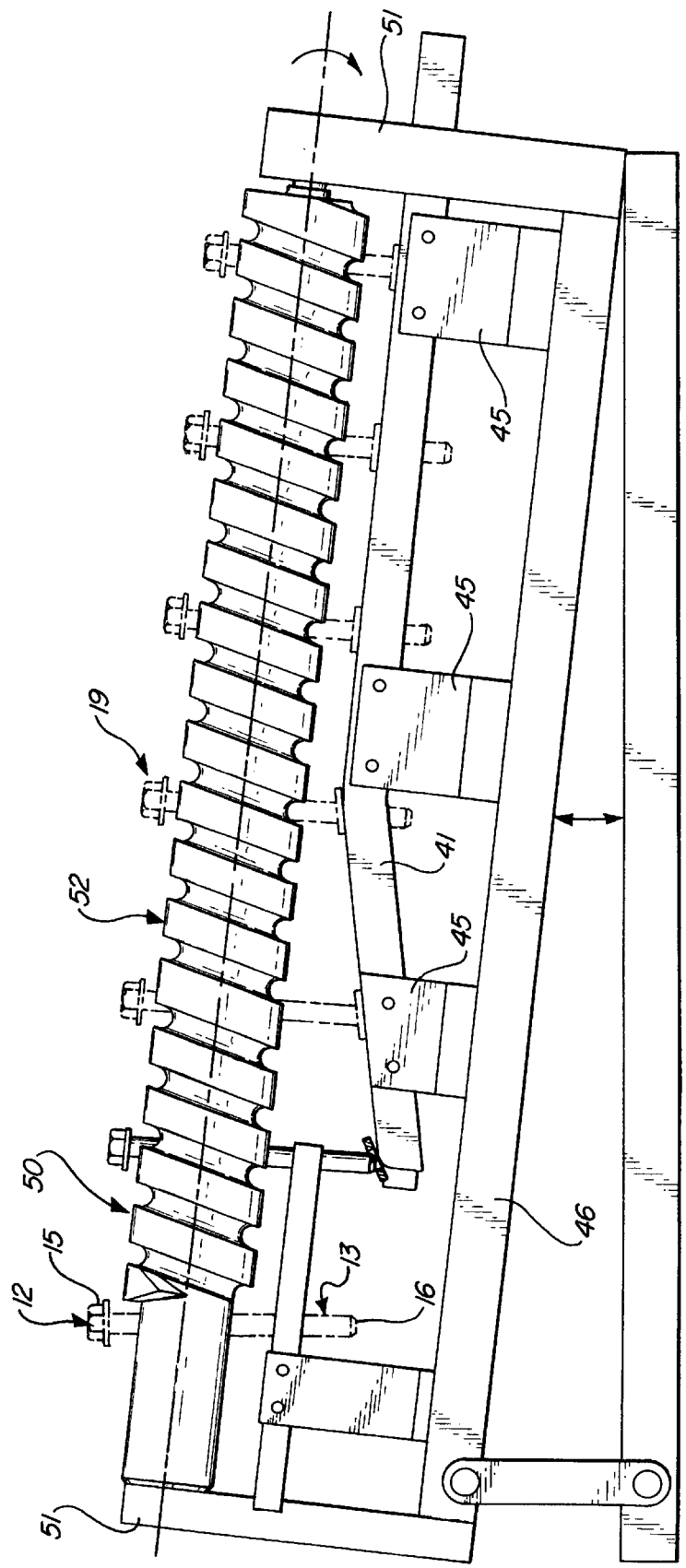
FIG. 7 shows a partial plan view of the bolt and washer assembly machine of the present invention in operation depicting the conveyor and channels thereof.

Once the washer 14 is picked up by the bolt 12, as best illustrated in FIGS. 5, 7 and 8, the washer 14 moves further on the shank 13 of the bolt 12 by sliding along a pair of inclined rails 41 and 42 defining therebetween a slot, groove or channel 43 which receives the shank of the bolt 12 as it is conveyed through the assembly machine 10. As the bolt 12 is further conveyed through the assembly machine 10, and the washer 14 rises further along the bolt 12, a greater portion of the shank 13 of the bolt 12 becomes located in the channel 43. The rails 41 and 42 are supported on the base plate 46 through mounting supports 45 extending upward from the base plate 46 to the pair of rails 41 and 42. The supports 45 are designed to be easily adjustable and to accommodate various types of bolts 12 and washers 14, as necessary so as to provide adjustability to establish various inclination angles for the rails 41 and 42.

Figure 1:
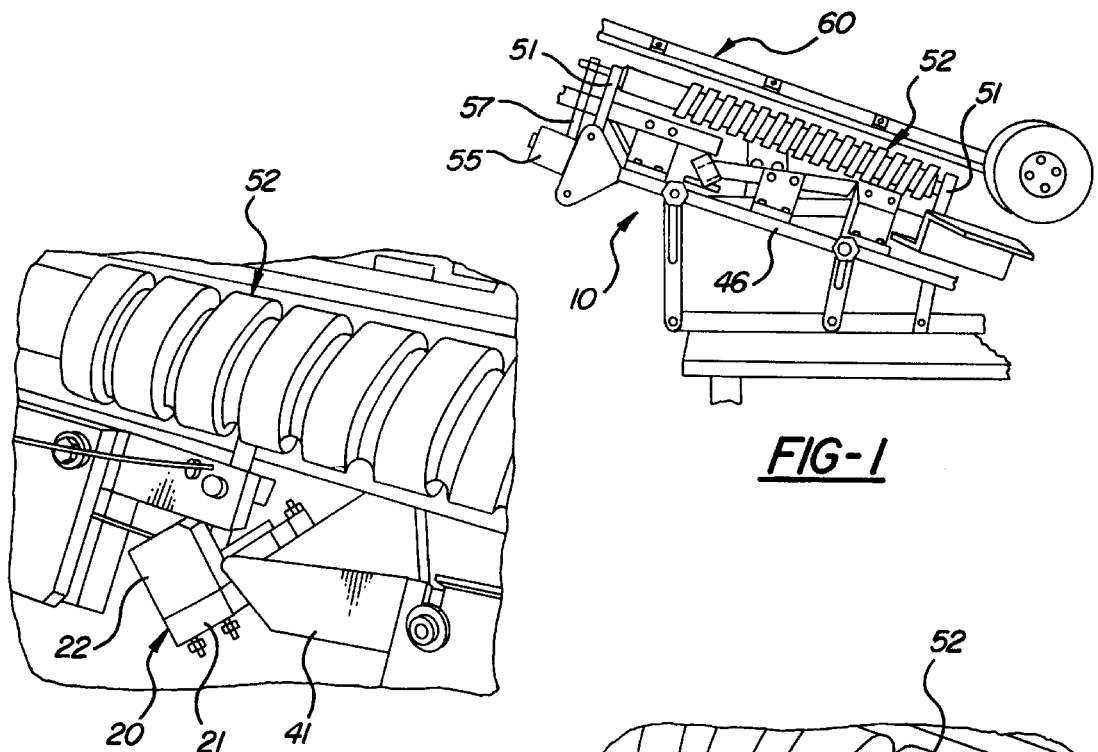
FIG. 1 shows a plan view of the bolt and washer assembly machine of the present invention.

The bolt 12 is conveyed through the bolt and washer assembly machine 10 of the present invention using a conveyor assembly 50, as best shown in FIGS. 1, 5 and 7. The conveyor assembly 50 primarily consists of a ball screw 52, journalled in a pair of supports 51, and a motor 55 mounted on one of the supports 51 for continuously rotating the ball screw 52. The motor 55 is connected to an end of the ball screw 52 through a drive belt 57, appropriate for transferring the rotational momentum of the motor 55 to the ball screw 52. The motor 55 and drive belt 57 are preferably chosen to continuously operate the ball screw 52 at a rotational constant speed. The motor 55 is preferably chosen to be operable over a range of speeds. The actual speed of operation of the conveyor assembly will be determined by the size and shape of the bolts and washers to be assembled as well as by the accuracy of the positioning of the washer supply rail assembly relative to the conveying of the bolt 12 along the ball screw 52 of the assembly machine 10. However, the assembly machine 10 of the present invention is capable of assembling washers 14 onto bolts 12 at a rate of over one hundred fifty per minute.

Figure 6:
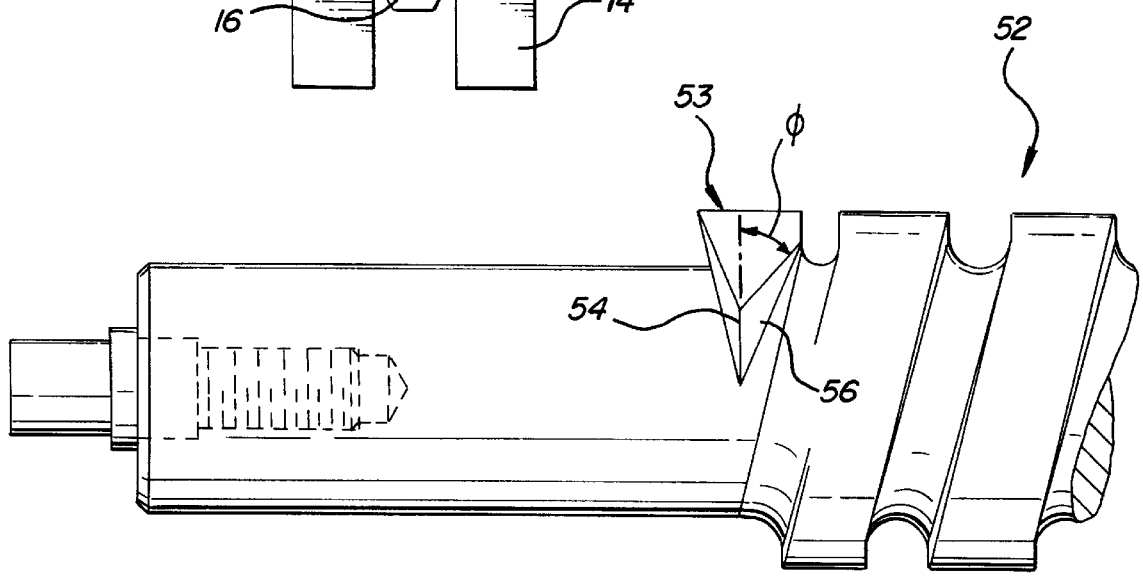
FIG. 6 shows a detail plan view of the start of the helical thread of the ball screw of the bolt and washer assembly machine of the present invention taken along line 6—6 of FIG. 5.

The ball screw 52 of the present invention has a start, first, or lead end 53, as shown in FIG. 6, which includes a lead thread 54 designed to have a lead-in ramp 56 which is preferably designed to have an angle $\phi$ with respect to a plane perpendicular to a center axis of rotation for the ball screw 52. The angle $\phi$ is chosen such that the bolt 12 to be advanced into the machine can be easily separated from other bolts 12 lined up behind it. Similarly, the angle $\phi$ also allows the bolts 12 to be continuously carried along the ball screw 52 without undue frictional effects. While the ball screw 52 is capable of carrying multiple bolts 12, the lead thread 54 allows only one bolt 12 to enter the ball screw 52 at a time to prevent jamming the ball screw 52, or damaging the bolt 12. After a first bolt 12 enters the ball screw 52, a second bolt 12 is moved into position to be picked up by the lead thread 54 following a complete revolution of the ball screw.

The bolts 12 are lined up and fed into the ball screw 52 through the use of a feeder track carrier 60 as shown in FIG. 5. The feeder track carrier 60 is designed to receive the head 15 of the bolt 12 and have the shank 13 of the bolt 12 extend downward therefrom under the force of gravity. The feeder track carrier 60 preferably consists of an overhead spaced apart pair of rails 61 spaced on either side and a guide surface 65 on a guide bar 64 attached to the base plate 46 of an axis 62. The overhead rails 61 have a recess 63 therebetween wherein the head 15 of the bolt 12 is received and is further delimited by a pair of rails 71 and 72 located above the ball screw 52 to define one end of the recess 63 and a bight portion 66 spanning the recess 63. Each of the pair of rails 61 has an outwardly extending leg 67 and 68, respectively. The first leg 67 and second leg 68 extend substantially perpendicular from each spaced apart rail 61 and are mounted to the pair of rails 71 and 72, respectively, which define a channel, passage or opening 73 having the shank 13 of the bolt 12 passing therethrough. The pair of rails 71 and 72 preferably define the opening 73 such that the shank 13 can freely pass therethrough with a minimum of interference and friction. However, the pair of rails 71 and 72 constrain the shank 13 of the bolt 12 such that it will experience a minimum of lateral offset movement. The above ensures that the bolt 12 will properly capture the washer 14 and convey through the assembly machine 10 without interruption or problem.

Similar to the design of the overhead rail 61, the first and second inclined rails 41 and 42 define the passage 43, so the end 16 of the shank 13 can easily pass therethrough, but is allowed a minimum of lateral movement within the channel 43. The above described design for the first and second inclined rails 41 and 42 and the passage 43 prevents the threads (not shown) located on the shank of the bolt 12 from becoming damaged during the assembly process.

In operation, the assembly machine 10 of the present invention is activated by rotating the conveyor assembly 50 and supplying bolts 12 and washers 14 utilizing respective supply systems. As a first bolt 12 is supplied to the rotating conveyor assembly 50, the lead thread 54 of the lead end 53 of the ball screw 52 captures the shank 13 of the bolt 12 therein and accurately conveys the bolt 12 along the distance of the ball screw 52 of the conveyor assembly 50 while the head 15 of the bolt 12 slides along the pair of rails 71 and 72. After the first bolt 12 is captured by the lead thread 54 of the assembly machine 10, a second bolt 12 is supplied to the lead thread 54 to repeat the capturing and accurate conveying of the second bolt along the ball screw 52.

A first washer 14 is supplied to the assembly machine 10 along the washers' supply rail assembly and is positioned at an appropriate angle to be picked up by the end 16 of the shank 13 of the bolt 12. After the first washer 14 is picked up by the bolt 12 as the bolt 12 proceeds through the conveyor assembly 50, a second washer 14 is supplied and positioned as soon thereafter as possible based upon gravity and friction or, alternatively, air assist, and is picked up by a second bolt 12 as it is conveyed through the assembly machine 10. The above described operations are intended to be repeated continuously. Once the washer 14 is caught on the shank 13 of the bolt 12, the conveyor assembly 50 continues to convey an assembled bolt and washer 19 to the end of the helical thread where the assembled bolt and washer 19 are preferably deposited in a container for shipping.

It should be understood by a person of ordinary skill in the art that the present invention can be modified without departing from the scope of the following claims. The preferred device and method disclosed above are intended to be a complete disclosure of the preferred embodiment of the present invention to enable a person of ordinary skill in the art to practice the invention as set forth in the following claims. The invention as set forth in the following claims is not intended to be limited by the above description. Accordingly, the invention as set forth herein should only be limited by the following claims.

What is claimed is:

1. A device for the automated assembly of an element, having a hole located therein, on a fastener having a head portion and an opposite shank portion, said assembly device comprising:

a base;

means for supplying a plurality of said elements to said device, said element supplying means mounted to said base, said element supplying means sequentially supplying said plurality of elements;

means for supplying a plurality of fasteners to said device, said fastener supplying means mounted to said base in spaced relation to said means for supplying said plurality of elements, said fastener supplying means having a slotted rail for suspending said fastener such that said head portion is supported by said slotted rail and said shank portion extends through the slot in said slotted rail such that the head portion slides along said slotted rail while said shank portion depends therefrom;

a helical screw mounted to said base, said helical screw being aligned with said means for supplying fasteners, said helical screw having a first end, a second opposite end, a longitudinal axis and a helical groove extending along at least a portion of said helical screw, said fastener supplying means positioned to supply said plurality of said fasteners sequentially to said first end of said helical screw in a direction aligned with said longitudinal axis of said helical screw, said fastener supplying means conveying said plurality of fasteners along said slotted rail such that said shank portion of each said plurality of fasteners is engaged by said helical groove to positively move each of said plurality of fasteners along said slotted rail as said helical screw is rotated;

said means for supplying a plurality of said elements further comprising means for orienting said plurality of elements for mounting an element onto each said shank portion of said fasteners, said element orienting means communicating with said element supplying means and receiving said elements therefrom; and means for rotating said helical screw mounted to said base and complementary with said helical screw whereby as said rotating means rotates said helical screw each of said plurality of fasteners are sequentially moved along said slotted rail of said means for supplying a plurality of fasteners by said shank of said fasteners being engaged by said helical groove of said helical screw to said orienting means of said element supplying means so as to mount a corresponding element onto each shank of said fastener for further handling thereof.

2. The device of claim 1 further comprising a guide bar having a guide surface located proximate said helical thread of said helical screw for preventing each of said plurality of fasteners from escaping from said helical groove of said helical screw, said guide surface being aligned parallel with said longitudinal axis of said helical screw.

3. The device of claim 2 wherein said guide surface is aligned parallel with said longitudinal axis of said helical screw.

4. The device of claim 1 wherein said helical screw is inclined at a predetermined angle from horizontal.

5. A method of assembling a washer having a hole therein on a bolt having a head portion at one end and an opposite end with a shank portion, said method comprising the steps of:

providing a conveyor mechanism having a base, said conveyor mechanism further having a slotted rail for suspending said bolt such that said head portion is supported by said slotted rail and said shank portion extends through the slot in said slotted rail such that said head portion freely slides along said slotted rail while said shank portion depends therefrom, said conveyor mechanism further having a helical screw mounted to said base, said helical screw having a first end, a second opposite end, a longitudinal axis and a helical groove extending along at least a position of said helical screw for conveying said bolt;

supplying a plurality of bolts sequentially to said conveyer mechanism;

aligning said plurality of bolts supplied to said conveying means with said slotted rail and said helical screw of said conveyor mechanism such that said shank of each of said bolts is received within said helical groove of said helical screw of said conveyor mechanism;

supplying a plurality of washers sequentially to said conveyor mechanism; and orienting each of said plurality of washers such that said hole of each of said washers is aligned with a shank portion of each said bolts respectively for assembly thereto.

\* \* \* \* \*

UNITED STATES PATENT AND TRADEMARK OFFICE
CERTIFICATE OF CORRECTION

PATENT NO. : 5,864,937
DATED : February 2, 1999
INVENTOR(S) : Cecil et al.

It is certified that error appears in the above-identified patent and that said Letters Patent is hereby corrected as shown below:

Column 2, line 38, kindly delete "sever" and insert ---- severe ----.

Column 5, line 60, after "and 72" kindly insert -- and guide bar 64 --

Column 8, line 20, kindly delete "position" and insert ---- portion ----.

Column 8, line 23 kindly delete "veyer" and insert ---- veyor ----.

Signed and Sealed this

Twenty-fourth Day of August, 1999

Attest:

Q. TODD DICKINSON

*Attesting Officer*   *Acting Commissioner of Patents and Trademarks*